United States Patent [19]

Limoncelli

[11] 4,286,727

[45] Sep. 1, 1981

[54] TANK CAP

[75] Inventor: Anthony F. Limoncelli, Marlborough, Conn.

[73] Assignee: United Technologies Corporation, Hartford, Conn.

[21] Appl. No.: 179,397

[22] Filed: Aug. 19, 1980

[51] Int. Cl.³ ............................................. B65D 45/00
[52] U.S. Cl. ................................. 220/244; 220/251; 220/246; 220/331; 220/333
[58] Field of Search .................. 220/244, 1, 251, 314, 220/332, 329, 333, 331

[56] References Cited

U.S. PATENT DOCUMENTS

| 3,391,817 | 7/1968 | Shaw | 220/246 |
| 4,189,059 | 2/1980 | Shaw | 220/246 |

Primary Examiner—George T. Hall
Attorney, Agent, or Firm—Norman Friedland

[57] ABSTRACT

A retractable cap for a tank storing oil or the like for airplane use carries a handle that prevents the nacelle access door from closing unless the cap is secured in position. A double hinge arrangement for the cap assures that the "O" seal doesn't become distorted when the cap is replaced in the secured position.

6 Claims, 5 Drawing Figures

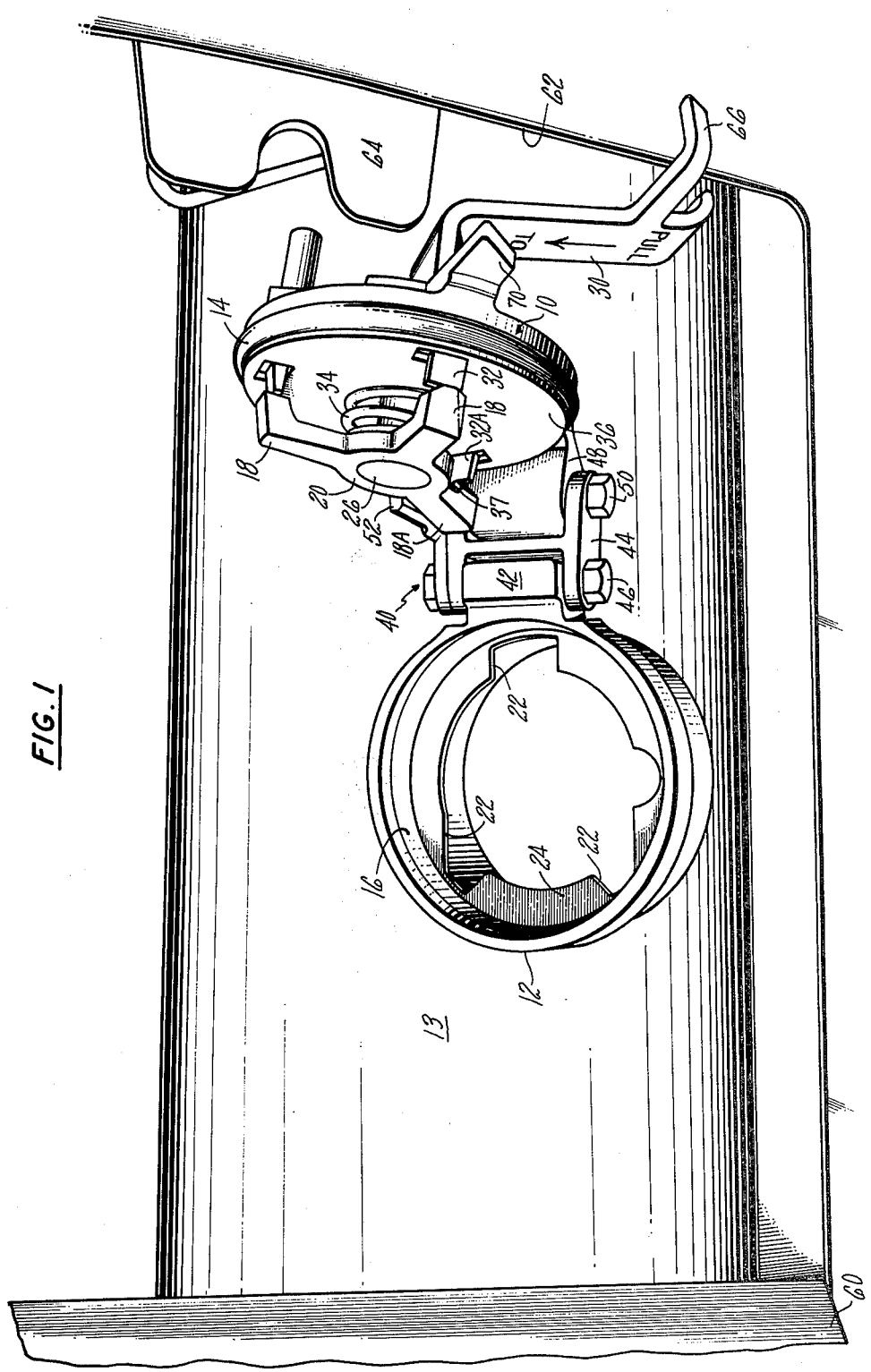

TANK CAP

DESCRIPTION

TECHNICAL FIELD

This invention relates to caps for oil tanks designed for aircraft use and particularly to a hinged type that prevents access door closure until the cap is secured into position.

BACKGROUND ART

The typical aircraft oil tank cap is an unhinged removable element that securely fits into the end of the neck of the tank and comprises a circular body having a peripheral groove to receive an "O" ring that bears against the inner diameter of the neck of the tank. A rotating handle that has limited movement positions a plurality of lugs into complimentary recesses formed in a lip extending circumferentially around the inner diameter of the neck. The lugs are spring loaded and a cam on the handle serves to position the lugs axially. Hence by lifting up the handle the lugs are freed from the lip and rotation thereof aligns the lugs with the recess to remove the cap and hence providing access into the tank.

This heretofore type or cap was susceptible of being left off the tank or improperly secured resulting in adverse consequences. For example, the handle of the cap could be in the secured position and to the eye of an inspector thereof, it would look secured. But while appearing to the eye to be secured, it merely would be loosely fitted and obviously could fall out of the neck allowing oil to escape.

Additionally, if the cap was not inserted properly, that is parallel to the wall of the neck, the "O" ring could twist or become distorted leading to excessive wear and/or inhibiting its sealing function.

I have found that I can obviate the problems noted above by providing a double hinge arrangement that retains the cap in proximity to the neck and restrains its motion in the opening and closing positions to a slightly axial motion that guides the cap parallel to the wall of the tank's neck. The tank locking mechanism carries a generally L-shaped handle that serves to lift and rotate a center rod for positioning the lugs into and out of the recess for locking the cap to the inner lip. A plate-like cam mounted adjacent the hinge cooperates with a lever extending from the handle prevents the handle from rotating except when the cap is in the closure position. The handle can then be rotated horizontally moving the lugs behind the lip and then rotated vertically to urge the lug toward the body of the cap, locking it into place.

The handle also serves to prevent the access door on the aircraft from closure until the cap is secured into position. Extension levers from the handle and the top of the cap are provided to assure blockage of the access door irrespective of the handle's location when it is in the unsecured position, whether it is in or spaced away from the tank's neck.

DISCLOSURE OF THE INVENTION

An object of this invention is to provide for a tank for aircraft an improved cap.

A feature of the cap is a double hinge arrangement that assures parallel positioning of the "O" seal relative to the neck opening of the tank when the cap is inserted into position.

Another feature of the invention is a cam structure extending vertically adjacent the hinge mechanism for interfering with an extension arm on the handle of the cap for preventing horizontal rotation of the handle when it is retracted from the opening of the neck of the tank.

Another feature is a plurality of extending arms on the handle and top of the cap that interfers with the closure of the access door whenever the cap is in the unsecured position.

Other features and advantages will be apparent from the specification and claims and from the accompanying drawings which illustrate an embodiment of the invention.

BRIEF DESCRIPTION OF DRAWINGS

FIG. 1 is a perspective view of the cap attached to the neck opening of the tank as viewed when the aircraft access door is opened.

BEST MODE FOR CARRYING OUT THE INVENTION

Figure 3:
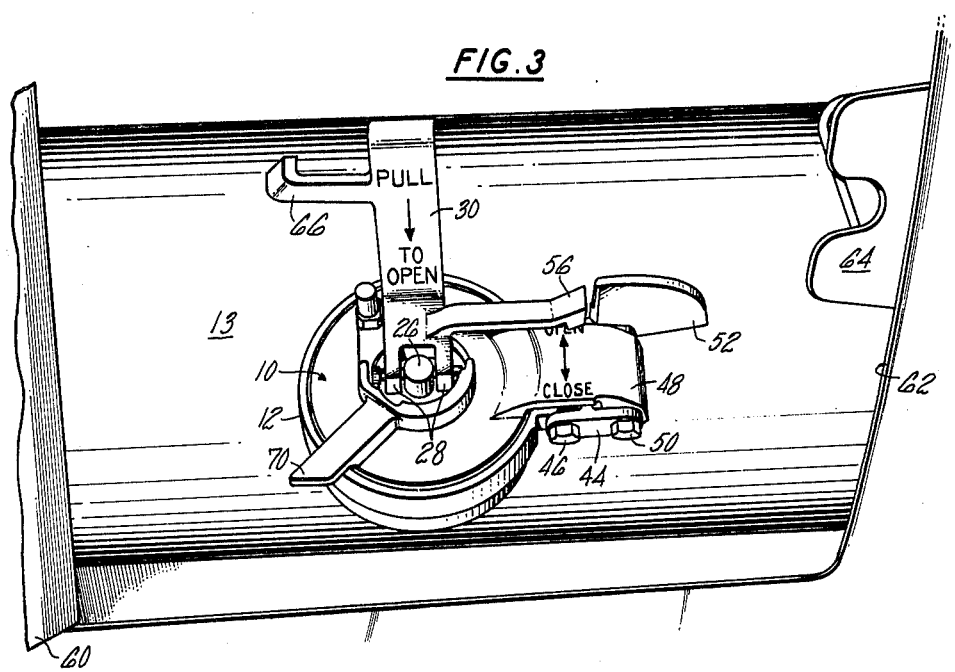
FIG. 3 is a perspective view of the cap in FIG. 1 in the closed and secured position.

Reference is made to all of the FIGS. showing the details of the cap in several of its positions which will best illustrate the invention. As noted in FIG. 1, the cap comprises a circular body 10 adapted to fit into a complimentary opening in the neck 12 of the tank 13. "O" seal 14 is mounted in a peripheral groove formed in body 10 that engages the side wall 16 of neck 12. A plurality of lugs 18 extending radially from the central hub 20 serve to fit into complimentary recesses 22 formed in the circumferential lip 24. Hub 20 is secured to the end of plunger shaft 26 which is attached at its other end to the bifurcated end 28 of handle 30. As shown in FIG. 1, the lugs 18 abut against stops 32 that serve to prevent the handle from closing when in its fully retracted position. Compression spring 34 urges lugs 18 away from the bottom face 36 of the circular body 10. Stop 32A may carry an upstanding member 37 that bears against the side edge of lug 18A to limit its rotational travel.

Figure 4:
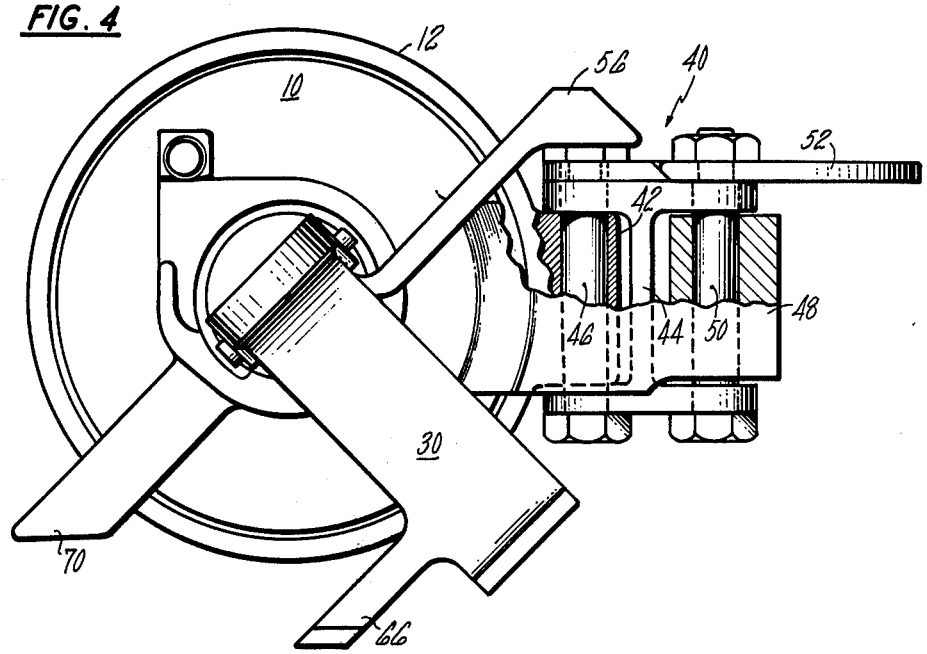
FIG. 4 is a top plan view partially in section illustrating the hinge arrangement of the cap.
Figure 5:
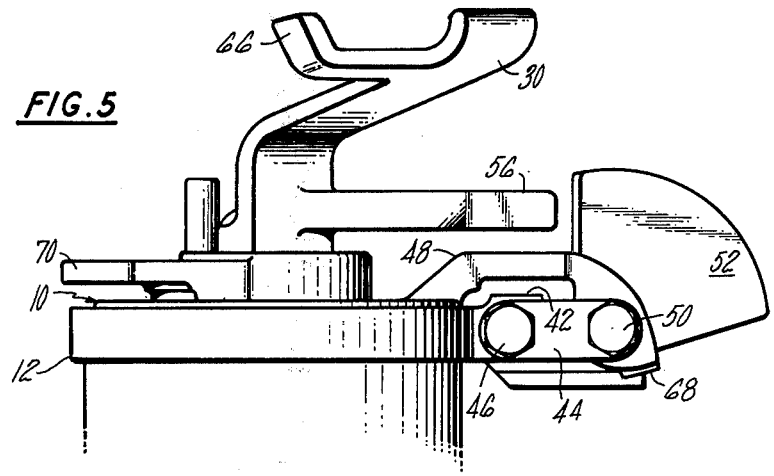
FIG. 5 is a side elevation of the cap in the closed position.

As can be seen from FIG. 4, the cap is hingedly secured by a tandem hinge arrangement generally illustrated by reference numeral 40. Unitary with neck 12 is radially extending element 42. The generally H-shaped member 44 is pivotally secured at one end of the parallel arms of the H-shaped member 44 by the shaft 46 and a radially extending element 48 unitary with circular body 10 is hingedly secured by shaft 50 to the opposite parallel arms of H-shaped member 44. This hinged connection gives an axial motion to the circular body 10 when it is received into the neck 12 avoiding twisting, distorting and abnormal wear on the "O" ring seal.

Figure 2:
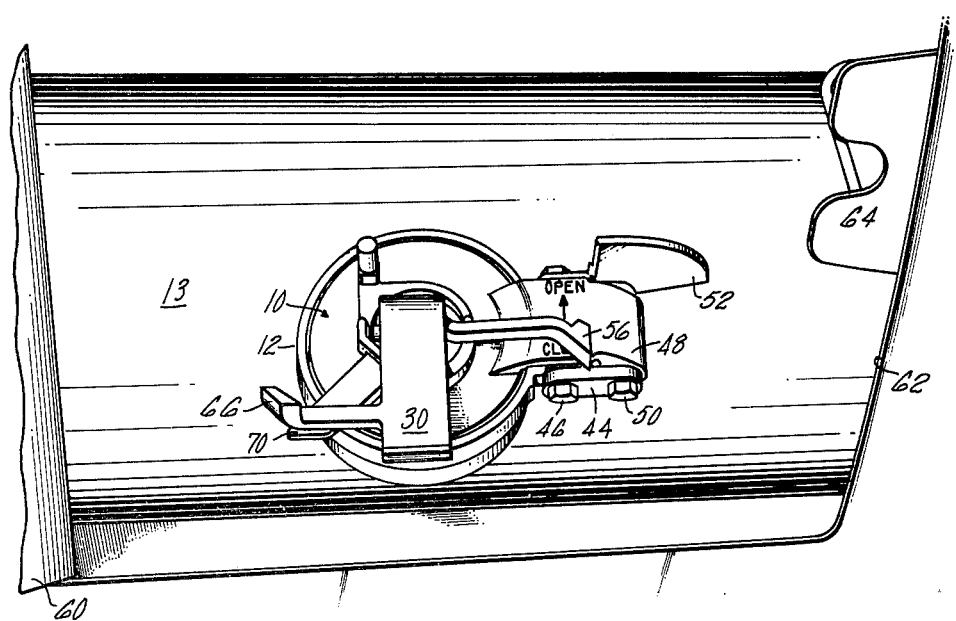
FIG. 2 is a perspective view showing the cap of FIG. 1 in the closed position without it being secured.

In operation as noted from FIG. 1, the retractable cap is moved from the open position by pivoting the circular body 10 to fit into the neck 12 and the lugs fit into the complimentary recess 22. As shown in FIG. 2, the handle is in the up position ready to lock the cap in its place. It will be noted from FIG. 4 that depending arm 56 is positioned beyond the cam element 52 (i.e. to the rear in the view shown). Hence, when the cap is retracted, the arm 56 rides rightwardly and stays to the right of and parallel to cam 52. This serves to prevent the handle from being rotated clockwise when in the opened position which otherwise could allow the cap to close and appear secured without it being so.

Once the cap is inserted into the neck of the tank, the handle is rotated clockwise (see FIG. 3) (from open to closed as shown) and the handle is lifted upwardly away from the plane of the paper. This urges the circular body toward the lugs and compresses spring and presses the lugs against the lip 24 locking the cap into position.

As is apparent from the foregoing, raising handle 30 causes the spring to force circular body away from the lugs 18 and permitting rotation of the handle in the horizontal plane. This permits removal of the cap and access to the tank. The tank is mounted in the body of the airplane, say the nacelle and access is through opening 62 which is covered by panel door 60 (only partially shown). The door is a suitably hinged door which latches into the catch 64 for closure.

To prevent the possiblity of the access door from closing whenever the cap is not secured in position, the cap and handle are formed so that the access door cannot be closed. To this end the handle 30 carries an extension arm 66 that protrudes through the access door when the cap is in the opened position. To assure that the open position of the cap is always in the location where the arm 66 is effective, the extension 48 carries stop 68 that limits its opening travel by contracting the transverse arm of the H-shaped member 44. Protrusion 70 formed in the cap circular body also serves to abut the access door in the event the handle is turned if for some reason the cam 52 is by-passed.

It should be understood that the invention is not limited to the particular embodiments shown and described herein, but that various changes and modifications may be made without departing from the spirit and scope of this novel concept as defined by the following claims.

I claim:

1. In combination, a cap for an oil tank mounted in an aircraft having an access door mounted in proximity to the cap and retractable to allow access to the cap, said cap having a circular body adapted to fit into the neck of the tank, a seal around the periphery of said circular body engaging the wall of the neck for sealing the fluid contained by the tank, a hub having lug elements extending radially and fitting complimentary recesses formed in a lip in said neck, a plunger rod extending through said circular body connected to said hub for rotating said lugs and positioning said lugs relative to said circular body, a handle mounted on one end of said plunger rod remote from said lugs for rotating and positioning said lugs, said cap being hingedly connected to said neck, said hinge connection including a pair of tandem mounted hinges, one of said hinges being connected to said neck and the other of said hinges being connected to said cap, a hinge element disposed between said neck and cap hingedly supporting said cap to said neck for obtaining relative parallel movement of said seal relative to the wall of said neck when said cap is being placed in an open and closed position, an extension element on said handle, a cooperating cam therefor extending from said neck for limiting rotation of said handle in a given direction when the cap is in the fully retracted position, and means on said handle preventing closure of said access door when said cap is in the unsecured condition.

2. The combination as in claim 1 wherein said last mentioned means includes a portion of said handle extending relatively normal to the remaining portion of said handle that is connected to said plunger rod which engages said access door when said handle is extended in the cap unlocked position and is retracted its full distance.

3. The combination as in claim 2 wherein said extending portion includes a radial extending arm engaging said access door in a given cap retracted position.

4. The combination as in claim 3 wherein said hinge element includes an H-shaped member having one pair of opposing arms of said H pivotally attached to said neck and the opposite end of said pair of arms pivotally attached to said circular body.

5. The combination as in claim 4 including a radially extending portion attached to the circular body and extending therefrom for engaging said access door when the cap is in a fully retracted position.

6. The combination as in claim 4 including a stop mounted on said circular element engaging the transverse arm of said H for limiting the extent of travel of the fully retracted position of said cap.

* * * * *